(12) United States Patent
Kapitza et al.

(10) Patent No.: US 7,034,431 B2
(45) Date of Patent: Apr. 25, 2006

(54) BRUSH HOLDING PLATE FOR AN ELECTRIC MOTOR, CORRESPONDING ELECTRIC MOTOR AND ASSEMBLY METHOD

(75) Inventors: Harald Kapitza, Ludwigsburg (DE); Bernd Walther, Bietigheim-Bissingen (DE)

(73) Assignee: Valeo Wischersysteme GmbH, (DE)

( * ) Notice: Subject to any disclaimer, the term of this patent is extended or adjusted under 35 U.S.C. 154(b) by 0 days.

(21) Appl. No.: 10/502,025

(22) PCT Filed: Jan. 21, 2003

(86) PCT No.: PCT/EP03/00542

§ 371 (c)(1), (2), (4) Date: Jul. 20, 2004

(87) PCT Pub. No.: WO03/065545

PCT Pub. Date: Aug. 7, 2003

(65) Prior Publication Data

US 2005/0146239 A1    Jul. 7, 2005

(30) Foreign Application Priority Data

Jan. 30, 2002  (DE) ................................. 102 03 489

(51) Int. Cl.
*H01R 39/38* (2006.01)
*H02K 13/00* (2006.01)

(52) U.S. Cl. ...................... 310/239; 310/245; 310/242; 310/238; 29/596; 29/598

(58) Field of Classification Search ................. 310/239, 310/245, 242, 238, 240
See application file for complete search history.

(56) References Cited

U.S. PATENT DOCUMENTS

| | | | | | |
|---|---|---|---|---|---|
| 2,695,968 | A | * | 11/1954 | Welch et al. | 310/246 |
| 3,656,018 | A | * | 4/1972 | Maher | 310/242 |
| 4,056,749 | A | * | 11/1977 | Carison et al. | 310/239 |
| 4,607,184 | A | * | 8/1986 | Takahashi et al. | 310/247 |
| 4,613,781 | A | * | 9/1986 | Sanders | 310/239 |
| 4,658,321 | A | * | 4/1987 | Lindner | 361/25 |
| 5,159,222 | A | * | 10/1992 | Southall | 310/239 |
| 5,495,134 | A | * | 2/1996 | Rosenblum | 310/242 |
| 5,696,418 | A | * | 12/1997 | Corbach et al. | 310/239 |
| 5,977,683 | A | | 11/1999 | Scheele et al. | |

FOREIGN PATENT DOCUMENTS

| | | | |
|---|---|---|---|
| DE | 3311271 A | * | 10/1984 |
| DE | 38 42 223 | | 6/1990 |
| DE | 4241404 A1 | * | 6/1994 |
| DE | 44 30 954 | | 3/1996 |
| EP | 0 101 546 | | 2/1984 |

* cited by examiner

*Primary Examiner*—Darren Schuberg
*Assistant Examiner*—Erik Preston
(74) *Attorney, Agent, or Firm*—Osha Liang LLP

(57) ABSTRACT

A brush holding plate includes cartridges and brushes, which are guided into the cartridges. The brushes are guided in a spring-loaded manner in the radial direction towards a central opening in the brush holding plate. The cartridges are arranged on the brush holding plate in such a way that they can be displaced from a radially outer pre-assembly position into a radially inner end assembly position.

11 Claims, 2 Drawing Sheets

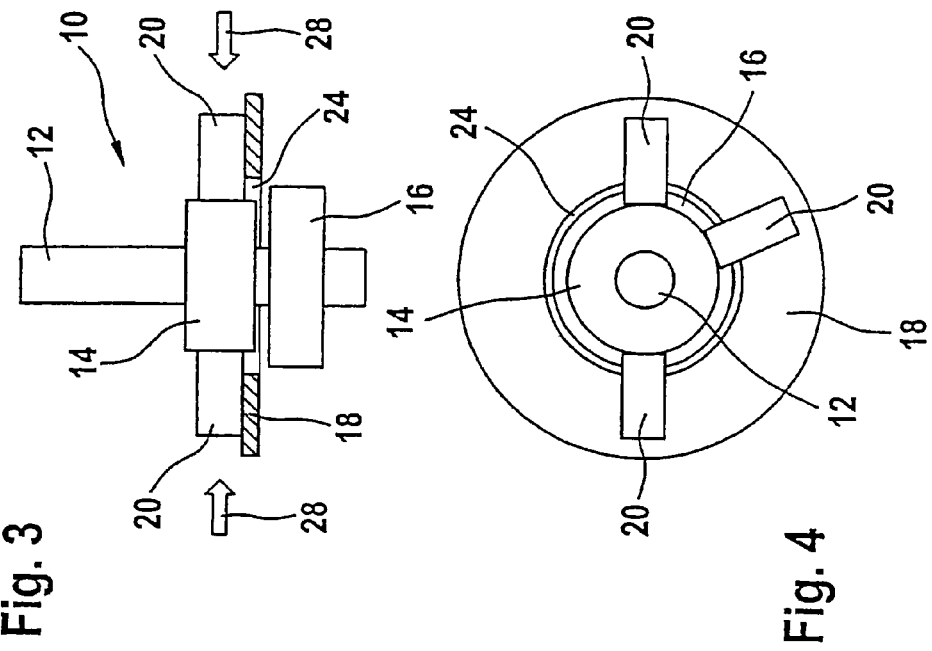
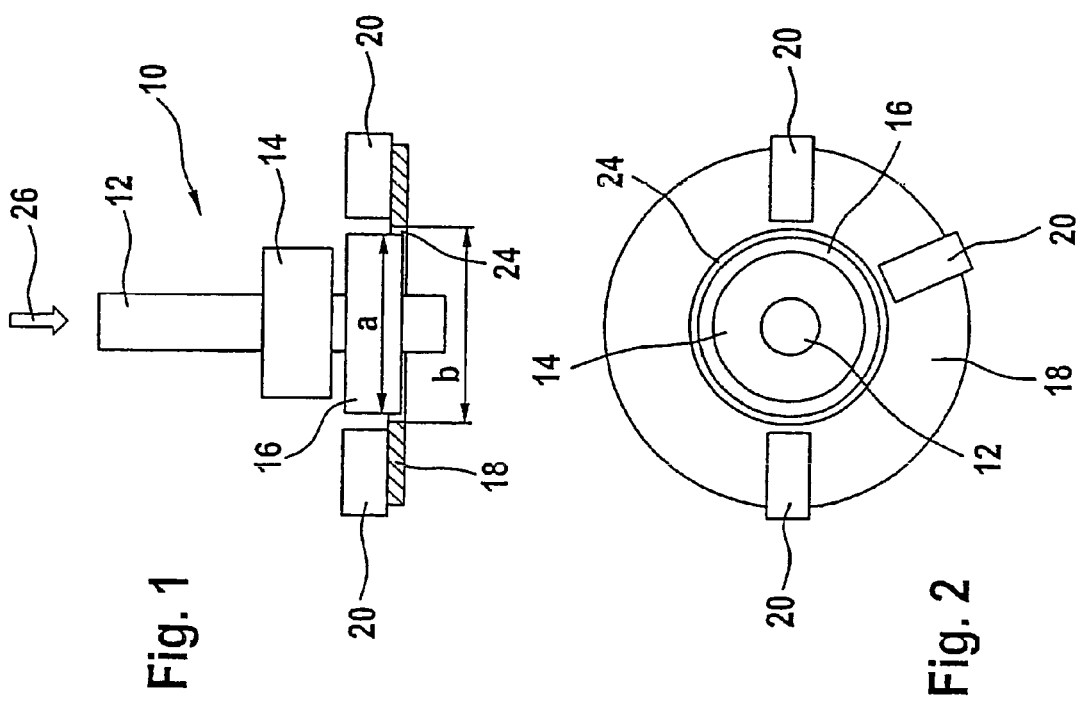

BRUSH HOLDING PLATE FOR AN ELECTRIC MOTOR, CORRESPONDING ELECTRIC MOTOR AND ASSEMBLY METHOD

The invention relates to a brush holder plate with cartridges and with brushes guided in the cartridges, wherein the guidance of the brushes takes place under spring loading in the radial direction towards a central aperture in the brush holder plate. The invention also relates to an electric motor with a brush holder plate of this kind and a method for assembling an electric motor of this kind. In order to facilitate the assembly of a brush holder plate of this kind in an electric motor, it is known to provide holding means which hold the brushes in the cartridges, which are firmly disposed on the brush holder plate, in a radially outer position.

It is known from DE 44 30 954 A1, for example, to use holding means in the form of a holding ring which is disposed in a preassembly position between the brushes of the brush holder plate and holds the brushes in a radially outer position. When the commutator is introduced the holding ring is displaced axially and frees the brushes, so that they act in a preloaded state against the commutator in the final assembly position.

It is also known from DE 33 28 683 C2 to provide holding means in the form of holding tongues which are formed in one piece with the cartridges and engage in depressions at the brushes such that the brushes are held in a radially outer position.

In the case of brush holder plates which are integrated into electric motors the contact faces, which project radially inwards, of the brushes lie against the commutator of the electric motor. In order to guarantee the most favourable possible flow of power between the rotating commutator and the cartridges disposed on the brush holder plate, the brushes only project slightly out of the cartridges. The free end sides of the respective cartridges are consequently disposed at just a small spacing from the commutator. The aperture in the brush holder plate is in this case slightly greater than the diameter of the commutator. These geometric restrictions result in disadvantages when assembling the electric motor. For example, the armature shaft comprising the armature and the commutator cannot be preassembled with bearing elements of a diameter exceeding the diameter in the brush holder plate. The brush holder plate consequently has to be assembled before pushing the corresponding bearing element onto the armature shaft.

The object of the present invention is therefore to develop a known brush holder plate such that the assembly of the brush holder plate in an electric motor can be managed with greater flexibility.

This object is solved according to the invention with a brush holder plate of the type initially mentioned in that the cartridges are disposed such that they can be displaced on the brush holder plate from a radially outer preassembly position into a radially inner final assembly position. The advantage of this arrangement lies in the fact that holding means for holding the brushes in a radially outer position are not imperative. It is merely necessary to ensure, when the cartridges are in the radially outer preassembly position, that the aperture in the brush holder plate is freed to an extent such that at least the commutator can be introduced between the brushes.

The displacement of the cartridges into the radially inner final assembly position ensures that the contact faces of the brushes come to lie against the commutator.

The cartridges and/or the brushes advantageously do not project into he aperture, or only to a slight degree, in the preassembly position. This ensures that the entire cross-sectional area of the aperture is available for assembling the brush holder plate. The armature shaft can consequently be guided through the aperture with the commutator and optionally with the bearing element in the preassembly position.

A preferred embodiment of the invention is distinguished by the fact that holding means hold the brushes in the cartridges in a radially outer position in the preassembly position. This has the advantage of enabling the distance between the preassembly position and the final assembly position to be kept to a minimum. As the brushes are held in the radially outer position, the cartridges do not have to be taken back so far radially outwards to free the aperture as when the brushes are not held in a radially outer, retracted position in the cartridges.

The brushes advantageously do not project out of the cartridges, or only to a slight degree, when the cartridges are in the preassembly position. This has the advantage of only having to dispose the cartridges so far radially outwards to free the aperture that they do not project into the aperture, or only to a slight degree. It is definitely desirable for the cartridges to project into the aperture almost up to the commutator in the final assembly position. This results in good lateral guidance of the brushes.

The holding means advantageously free the brushes during the displacement of the cartridges into the final assembly position or not until the final assembly position is reached. This prevents the holding means from being freed prematurely and therefore a premature and unintentional movement of the brushes radially inwards.

In one configuration of the invention the holding means encompass spring tongues which are connected to the cartridges and the free ends of which act on the brushes in the preassembly position. The spring-loaded brushes are thereby held in the radially outer position.

An advantageous form of configuration of the invention is achieved if the spring tongues lie on the side of the brush holder plate which is remote from the respective brush, wherein the free ends of the spring tongues reach through openings in the brush holder plate in the preassembly position. This has the advantage of protecting the spring tongues in the openings against inadvertent actuation.

According to the invention, in order to enable the brushes to be automatically freed, it is advantageous for the spring tongues to run up against the region surrounding the respective opening and free the respective brush when the cartridges are displaced radially inwards. When the spring tongues run up, these are deflected out of their position in which they hold the respective brush, whereby the brush is freed and moves radially inwards.

In a further embodiment of the invention, in order to prevent the cartridges from being moved unintentionally after freeing the brushes, the cartridges are formed such that they can be fixed to the brush holder plate, in particular locked or clamped to the latter, in the final assembly position. For this purpose it is possible, for example, to provide, at the cartridge or at the holding means, locking lugs or locking elevations which engage behind edges of the brush holder plate or in openings of the brush holder plate.

The object initially mentioned is also solved by an electric motor with a casing, with an armature shaft, with a commutator disposed on the armature shaft and with a brush holder plate according to the invention, wherein the contact faces of the brushes act against the commutator under spring loading in the final assembly position.

According to the invention, in order to simplify the process of assembling the electric motor, the armature shaft may be supported against the casing or an end shield via a bearing element of the diameter a, wherein the diameter b of the aperture is greater than the diameter a of the bearing element. The bearing element may be mounted on the armature shaft and guided through the aperture of the brush holder plate in the preassembly position. After guiding the element through, the cartridges are displaced radially inwards into the final assembly position, and the holding means optionally free the brushes.

The object initially mentioned is also solved by a method for assembling an electric motor according to the invention, wherein the armature shaft is preassembled with the bearing element, wherein the brush holder plate is inserted in the casing, as long as the cartridges are in the preassembly position, wherein the bearing element is guided through the aperture, and wherein the cartridges are displaced radially inwards into the final assembly position. The brushes may in this respect be held in the radially outer position in the cartridges by the holding means during assembly and freed upon displacing the cartridges into the final assembly position.

Further advantageous configurations and properties of the invention can be found in the following description, in which the invention is described and explained in detail on the basis of the embodiment which is represented in the drawings, in which:

FIG. 1 is a side view of essential parts of an electric motor according to the invention in the preassembly position;

FIG. 2 is a plan view of the electric motor according to FIG. 1;

FIG. 3 shows the electric motor according to FIG. 1 in the final assembly position;

FIG. 4 is a plan view of the electric motor according to FIG. 3;

Figure 5:
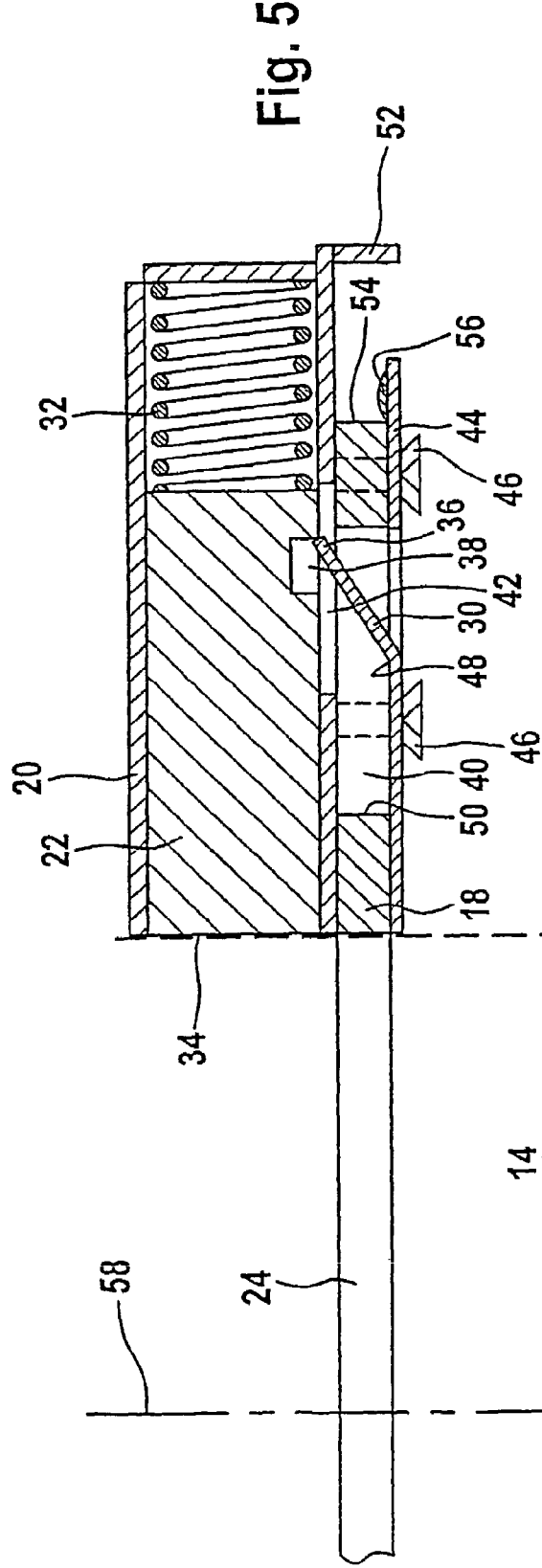
FIG. 5 is a cross section through a brush holder plate according to the invention in the preassembly position.
Figure 6:
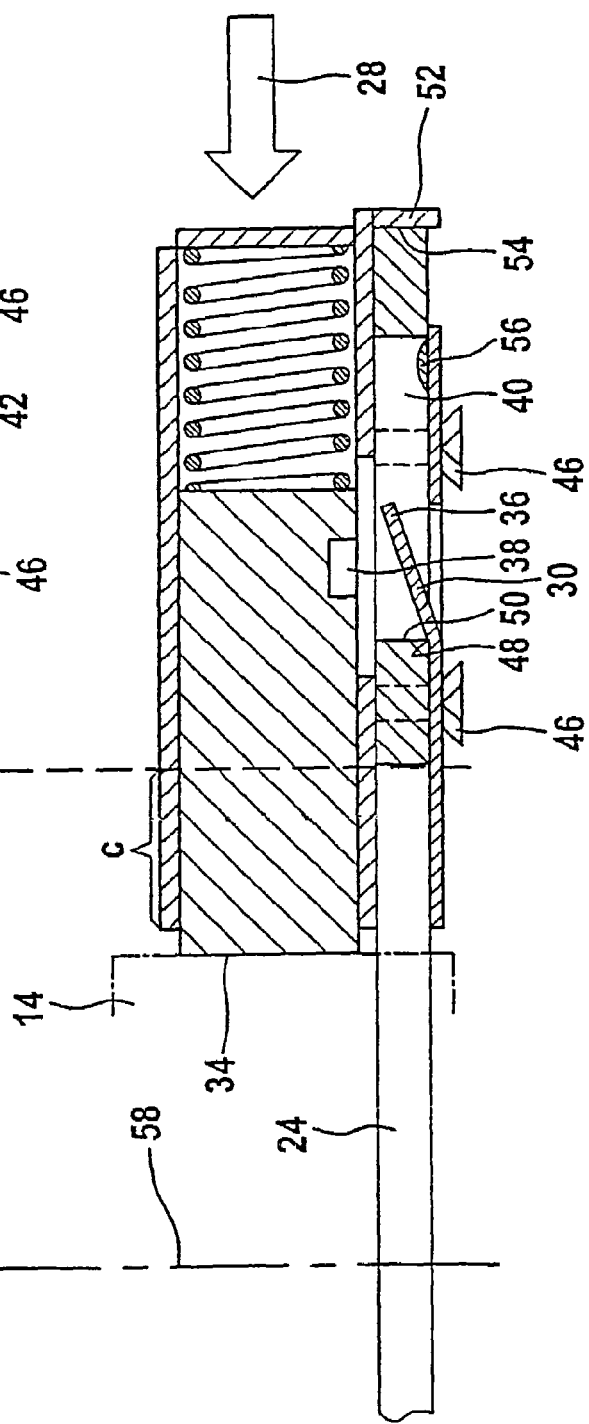
FIG. 6 is the cross section according to FIG. 5 in the final assembly position.

FIG. 1 shows a detail of an electric motor 10 comprising an armature shaft 12, a commutator 14, which is non-rotatably disposed on the armature shaft 12, and a bearing element 16 disposed on the armature shaft 12. Also represented is a brush holder plate 18, on which a total of three cartridges 20 are disposed. Brushes 22, which are represented in FIGS. 5 and 6, are guided in the cartridges under spring loading and point in the radial direction towards a central aperture 24.

The aperture 24 is of a diameter b which is slightly greater than the diameter a of the bearing element 16. As is clearly evident from FIGS. 1 and 2, the cartridges 20, with the brushes 22 disposed therein, do not project into the aperture 24 in the preassembly position. The armature shaft 12 together with the bearing element 16 can as a result be guided through the aperture 24 in the direction of the arrow 26 in the preassembly position represented in FIGS. 1 and 2 until the commutator 14 has reached its end position between the cartridges 20 or until the bearing element 16 has reached a bearing mount, which is not represented, on the casing side. In a next working step the cartridges 20, which are disposed so as to be displaceable radially on the brush holder plate 18, are displaced according to the arrows 28 out of their radially outer preassembly position represented in FIGS. 1 and 2 into the radially inner final assembly position represented in FIGS. 3 and 4.

On the one hand, it is conceivable according to the invention for the brushes 22 to be held in a radially outer, retracted position inside the cartridges 20 by means of holding means.

The holding means free the brushes 22 when the cartridges 20 are displaced into the final assembly position, so that these brushes are disposed under spring loading in the radial direction against the commutator 14 in spring-loaded fashion.

On the other hand, it is conceivable according to the invention for the brushes 22 to be secured in the cartridges 20 in a radially front position rather than a radially rear position. In the preassembly position the cartridges 20 are in this case to be disposed so far radially outwards that the brushes 22 do not project into the aperture 24. When the cartridges 20 are displaced into the final assembly position the contact sides of the brushes 20 come into contact with the commutator 14 and are pressed against this.

FIGS. 3 and 4 also clearly show that, when in the final assembly position, the cartridges 20 project into the aperture 24 and that the front sides of the cartridges 20 reach almost up to the commutator 14. This has the advantage of the brushes, which contact the commutator 14, being laterally supported as far as possible by the cartridges. This counteracts wedging of the brushes 22 in the cartridges 20.

In FIG. 5, which shows a longitudinal section through the brush holder plate 18 and a cartridge 20, the cartridge 20 is represented in the radially outer preassembly position. The brush 22 is held in a radially outer position against the spring force of a helical spring 32 in the cartridge 20 via a holding means in the form of a spring tongue 30. The contact face 34 of the brush 22 does not project out of the cartridge 20 in this position. The free end 36 of the spring tongue 30 projects through an opening 40 of the brush holder plate 18 and an opening 42 at the base side of the cartridge 20 into a holding opening 38 at the brush 22. The spring tongue 30 is a component part of a spring plate 44 which is disposed on the side of the brush holder plate 18 remote from the cartridge 20 and which is connected to the base side of the cartridge 20 via connecting pins 46.

After the commutator 14 indicated in FIG. 6 has been introduced between the cartridges 20, the cartridge 20 is displaced together with the spring plate 44 and spring tongue 30 in the direction of the arrow 28 into the final assembly position. The region 48 of the spring tongue 30 which faces the spring plate 44 runs against the inner edge 50 of the opening 40 shortly before the final assembly position is reached, whereby the free end 36 of the spring tongue 30 is moved in the direction of the spring plate 44 and the brush 22 is freed. Because of the spring force of the helical spring 32, the brush 22 is pushed radially inwards and acts by way of its contact face 34 on the commutator 14. The longitudinal axis of the aperture 24 bears the reference character 58.

In order to attain a defined final assembly position, the cartridge 20 comprises a stop edge 52 which strikes against the outer narrow side 54 of the brush holder plate 18 in the final assembly position.

In order to secure the cartridge 20 against unintentional displacement on the one hand in the preassembly position according to FIG. 5 and on the other in the final assembly position according to FIG. 6, the spring plate 44 comprises a locking elevation 56 on its side which faces the cartridge 20. The locking elevation 56 is located further outwards radially than the narrow side 54 of the brush holder plate 18 in the preassembly position according to FIG. 5. If the cartridge 20 is displaced radially inwards, the locking elevation 56 passes below the narrow side 54 or below the brush holder plate 18, with the spring plate 44 being elastically deformed. An appropriate expenditure of force is consequently required to displace the cartridges 20. The possibility of an automatic displacement of the cartridges 20 out of the preassembly position into the final assembly position is therefore excluded. Upon reaching the final assembly position, the locking elevation 56 then locks into the opening 40 of the brush holder plate 24 due to the resilience of the spring plate 44. It is thus impossible for the cartridge 20 to be automatically displaced radially outwards.

The difference by which the cartridge 20 has been displaced from the preassembly position according to FIG. 5 into the final assembly position according to FIG. 6 is marked by the letter c in FIG. 6.

All the features which are represented in the description, the subsequent Claims and the drawings may be essential to the invention both individually and in any desired combination with one another.

The invention claimed is:

1. A brush holder plate comprising:
cartridges and brushes guided in the cartridges, wherein the guidance of the brushes takes place under spring loading in the radial direction towards a central aperture in the brush holder plate, wherein the cartridges are disposed such that they can be displaced on the brush holder plate from a radially outer preassembly position into a radially inner final assembly position,
wherein holding means hold the brushes in the cartridges in a radially outer position in the preassembly position, and
wherein the holding means encompass spring tongues which are connected to the cartridges and the free ends of which act on the brushes in the preassembly position.

2. The brush holder plate according to claim 1, wherein at least one of the cartridges and the brushes does not project more than a slight degree into the aperture in the preassembly position.

3. The brush holder plate according to claim 1, wherein the brushes do not project more than a slight degree out of the cartridges in the preassembly position.

4. The brush holder plate according to claim 1, wherein the holding means free the brushes in the final assembly position or shortly before the latter is reached.

5. The brush holder plate according to claim 1, wherein the spring tongues lie on the side of the brush holder plate which is remote from the respective brush, wherein the free ends of the spring tongues reach through openings in the brush holder plate in the preassembly position.

6. The brush holder plate according to claim 5, wherein the spring tongues run up against the region surrounding the respective opening and free the respective brush when the cartridges are displaced radially inwards.

7. The brush holder plate according to any one of the preceding claims, wherein the cartridges are formed such that they can be fixed to the brush holder plate, in particular locked or clamped to the brush holder plate, in the final assembly position.

8. An electric motor comprising a casing, an armature shaft, a commutator disposed on the armature shaft and a brush holder plate, wherein the brush holder plate comprises cartridges and brushes guided in the cartridges, wherein the guidance of the brushes takes place under spring loading in the radial direction towards a central aperture in the brush holder plate, wherein the cartridges are disposed such that they can be displaced on the brush holder plate from a radially outer preassembly position into a radially inner final assembly position, wherein the contact faces of the brushes act against the commutator under spring loading in the final assembly position,
wherein holding means hold the brushes in the cartridges in the radially outer preassembly position, and
wherein the holding means encompass spring tongues which are connected to the cartridges and the free ends of which act on the brushes in the radially outer preassembly position.

9. The electric motor according to claim 8, wherein the armature shaft is supported against the casing or an end shield via a bearing element of the diameter a, wherein the diameter b of the aperture is greater than the diameter a of the bearing element.

10. A method for assembling an electric motor according to either of claims 8 and 9, wherein the armature shaft is preassembled with the bearing element, that the brush holder plate is inserted in the casing, wherein the cartridges are in the preassembly position, that the bearing element is guided through the aperture, and that the cartridges are displaced radially inwards into the final assembly position.

11. The method according to claim 10, wherein the brushes are held in the radially outer position in the cartridges by the holding means during assembly and are freed upon displacing the cartridges into the final assembly position.

* * * * *